(12) United States Patent
Sawyer et al.

(10) Patent No.: US 7,790,658 B2
(45) Date of Patent: Sep. 7, 2010

(54) INERT WEAR RESISTANT PTFE-BASED SOLID LUBRICANT NANOCOMPOSITE

(75) Inventors: W. Gregory Sawyer, Gainesville, FL (US); David L. Burris, Gainesville, FL (US)

(73) Assignee: University of Florida Research Foundaction, Inc., Gainesville, FL (US)

( * ) Notice: Subject to any disclaimer, the term of this patent is extended or adjusted under 35 U.S.C. 154(b) by 533 days.

(21) Appl. No.: 11/443,384

(22) Filed: May 30, 2006

(65) Prior Publication Data

US 2007/0105726 A1 May 10, 2007

Related U.S. Application Data

(60) Provisional application No. 60/685,275, filed on May 27, 2005.

(51) Int. Cl.
F16C 33/04 (2006.01)
B29C 59/00 (2006.01)
(52) U.S. Cl. .................. 508/106; 508/103; 508/104; 508/108; 264/122; 264/127
(58) Field of Classification Search .............. 508/106, 508/181–183, 103, 104, 108; 428/835.8, 428/840.2, 840.4, 844.3; 264/122, 127
See application file for complete search history.

(56) References Cited

U.S. PATENT DOCUMENTS 5,427,698 A * 6/1995 Hirokawa et al. ........... 508/106

7,176,166 B2 * 2/2007 Maeda ........................ 508/106
2005/0112326 A1 * 5/2005 Nun et al. .................... 428/143

FOREIGN PATENT DOCUMENTS

JP 2004149622 A * 5/2004

OTHER PUBLICATIONS

Burris et al. "Tribological Sensitivity of PTFE/Alumina Nanocomposites to a Range of Traditional Surface Finishes", Tribology Transactions, (2005), vol. 48, pp. 147-153.
Burris et al. "Improved Wear Resistance in Alumina-PTFE Nanocomposites With Irregular Shaped Nanoparticles", WEAR, (2006), vol. 260, pp. 915-918.
Li et al. The Friction and Wear Characteristics of Nanometer ZnO Filled Polytetrafluoroethylene:, WEAR, (2002), vol. 249, pp. 877-882.
Sawyer, W.G., et al.,"A Study on the Friction and Wear of Ptfe Filled with Alumina Nanoparticles," Wear, 254, pp. 573-580, (2003).
Schmitz, T.L., et al.,"Wear Rate Uncertainty Analysis," accepted for publication ASME Journal of Tribology, pp. 1-30, (2004).
Tanaka, Kyuichiro, et al., "Effect of Various Fillers on the friction and Wear of Polytetrafluoroethylene-Based Composites", Wear, 79, pp. 221-234, (1982).

* cited by examiner

Primary Examiner—Ellen M McAvoy
Assistant Examiner—Vishal Vasisth
(74) Attorney, Agent, or Firm—Thomas, Kayden, Horstemeyer & Risley LLP

(57) ABSTRACT

A PTFE-based composite material includes a PTFE major phase filled with a metal oxide minor phase. The major phase is intermixed with the metal oxide minor phase, wherein the minor phase includes a plurality of irregularly shaped metal oxide nanoparticles. The irregularly shaped nanoparticles provide substantial reductions in steady state wear rate over otherwise similar nanocomposites. The metal oxide can comprise aluminum oxide.

5 Claims, 7 Drawing Sheets

INERT WEAR RESISTANT PTFE-BASED SOLID LUBRICANT NANOCOMPOSITE

CROSS-REFERENCE TO RELATED APPLICATIONS

This application claims benefit of U.S. Provisional Application Ser. No. 60/685,275 entitled "INERT WEAR RESISTANT PTFE-BASED SOLID LUBRICANT NANOCOMPOSITE" filed on May 27, 2005, the entirety of which is incorporated herein by reference.

STATEMENT REGARDING FEDERALLY SPONSORED RESEARCH OR DEVELOPMENT

The United States Government has certain rights in this invention pursuant to NSF Grant No. CMS-0219889 and AFOSR-MURI Grant No. FA9550-04-1-0367.

FIELD OF THE INVENTION

The invention relates to inert PTFE-based low wear composite materials.

BACKGROUND OF THE INVENTION

Polytetrafluoroethylene (PTFE) exhibits desirable tribological characteristics, including low friction, high melting temperature and chemical inertness. Based on these characteristics, PTFE is a frequently used solid lubricant both as a filler and matrix material. Without a filler, however, PTFE suffers from a relatively high wear rate, generally precluding its use in frictional applications, including use as a bearing material.

As a matrix material, PTFE has been successfully filled with various nanoparticles, including alumina, zinca, and carbon nanotubes. Regarding alumina filling, Sawyer et al. [Sawyer, W. G., Freudenburg, K. D., Bhimaraj, P., and Schadler, L. S., (2003), "A Study on the Friction and Wear of Ptfe Filled with Alumina Nanoparticles," Wear, 254, pp. 573-580] discloses 38 nm substantially spherical shaped $Al_2O_3$ filler particles for improving the wear performance of PTFE. The wear resistance of this nanocomposite was reported to increase monotonically with filler wt %, eventually being 600 times more wear resistant than unfilled PTFE at a loading of 20 wt. % $Al_2O_3$. Although the wear performance provided by PTFE/alumina nanocomposites disclosed by Sawyer et al. represents a major improvement over PTFE, the high filler percentage required to reach the desired wear level significantly raises the cost of the nanocomposite. In addition, for certain applications wear rates lower than 600 times better than PTFE are desirable and may even be required. Accordingly, a PTFE nanocomposites is needed which provides improved wear resistance, while at the same time requiring a lower filler percentage as compared to the PTFE nanocomposites disclosed by Sawyer et al.

SUMMARY

A PTFE-based composite material comprises a PTFE comprising major phase filled with a metal oxide minor phase. The major phase is intermixed with the metal oxide minor phase, wherein the minor phase comprises a plurality of irregularly shaped metal oxide nanoparticles. The minor phase can comprise 1 to 10 wt. % of said composite, such as 3 to 7 wt. %. In one embodiment, the metal oxide nanoparticles have shapes characteristic of milled particles. The metal oxide can comprise aluminum oxide. Regarding performance, the composite can provide a steady state wear rate of $K<2\times10^{-5}$ mm$^3$/(Nm) for a 5% wt. % minor phase. composite.

A method of forming wear resistant composite materials comprises the steps of blending nanoscale metal oxide particles and PTFE particles, wherein the metal oxide particles are irregular shaped nanoparticles, and heating the nanoscale metal oxide particles and PTFE particles to form a nanocomposite. The heating step can comprise compression molding. A jet milling apparatus is preferably used for the blending step. In one embodiment, the metal oxide comprises aluminum oxide.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

Figure 1:
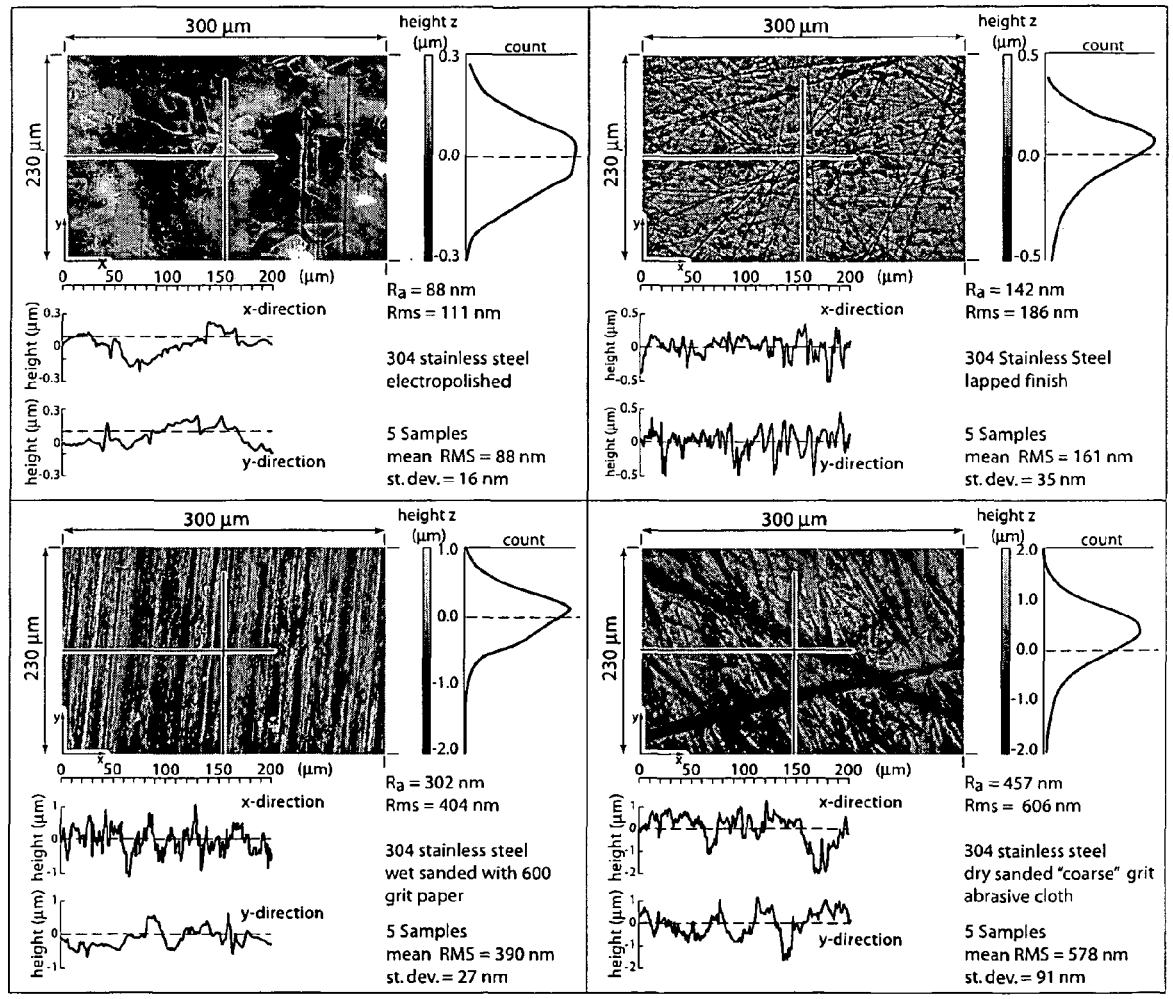
FIG. 1 provides surface profilometry data from PTFE nanocomposites according to the invention obtained from a scanning white-light interferometer with a 20× objective; clockwise from top left: electro-polished, lapped, dry-sanded and wet-sanded surfaces.

A polytetrafluoroethylene (PTFE)-based composite comprises a PTFE major phase filled with a metal oxide minor phase. The major phase is intermixed by the metal oxide minor phase. The metal oxide minor phase comprises a plurality of irregularly shaped metal oxide nanoparticles. The metal oxide can be a variety of metals oxides, including, but not limited to, aluminum oxide (e.g. alumina), zinc oxide, zirconium oxide and titanium dioxide. The metal oxide particles preferably generally comprise from 1 to 10 wt. % of the composite, such as 1, 2, 3, 4, 5, 6, 7, 8, 9 or 10% of the composite, but can be higher % (e.g. 15 wt. %) or lower % (0.5 wt. %) as compared to this range. Composites according to the invention provide higher wear resistance at much lower nanoparticle loading than current nanocomposite technology.

As used herein, the term "irregular shape" refers to non-spherical shaped particles, such as the shapes produced by crushing or milling action. The particles of irregular shape thus have asperities, points and edges as well as some flat areas. Such particles are available commercially, such as from Nanophase Technologies Corporation, Romeoville, Ill. or Alfa-Aesar (Ward Hill, Mass.), or can be formed by milling.

As used herein, the term "PTFE" includes polytetrafluoroethylene as well as its derivatives, composites and copolymers thereof, wherein the bulk of the copolymer material is polytetrafluoroethylene, including copolymers of tetrafluoroethylene and hexafluoro(propyl vinyl ether), copolymers of tetrafluoroethylene and perfluoro-2,2-dimethyl-1,3-dioxole, and copolymers of tetrafluoroethylene and vinyl fluoride, poly(vinyl fluoride), poly(vinylidene fluoride), polychlorotrifluoroethylene, vinyl fluoride/vinylidene fluoride copolymer, and vinylidene fluoride/hexafluoroethylene copolymer. Where the term "PTFE" is used herein to describe polytetrafluoroethylene that is copolymerized with one of the above-named polymers, it is contemplated that the actual polytetrafluoroethylene content in the copolymer is about 80% by weight, or higher.

Previous PTFE-alumina composites, such as disclosed by Sawyer et al. as noted in the Background above, utilized substantially spherical alumina particles. The inventors have discovered that irregularly shaped filler nanoparticles provide a much higher wear resistance to the composite, and provide the higher wear resistance at a significantly lower filler wt. %. For example, measured wear resistance for PTFE-alumina nanocomposites at a 5 wt. % filler level according to the invention have been found to be about 3,000 greater than PTFE and 10 times better than the most wear resistant Sawyer et al. PTFE-alumina composites which required 20 wt. %, or more, of alumina filler.

Nanocomposites according to the invention are highly chemically inert; derived from the highly non-reactive nature of both PTFE and the various metal oxides that may comprise the composite material. Very caustic environments may necessitate the use of PTFE which wears very rapidly, making frequent replacement a necessity. The addition of metal oxide particles in composites according to the invention will increase the wear resistance of the PTFE without sacrificing chemical inertness. Nanoparticles have the advantages of non-abrasiveness, and high number density at low filler wt %.

Although not required to practice the invention, Applicants provide the following proposed mechanism to explain the improved wear rate performance of PTFE-based composites according to the invention being obtainable at low metal oxide filler percentages. Since the metal oxide and the PTFE do not interact chemically, the superior wear resistance of this nanocomposite at low filler wt. % may be attributed to the inherent mechanical interaction of PTFE with the irregularly shaped metal oxide nanoparticles as opposed to the weak engagement that occurs with the spherical particles that are typically used. The irregularly shaped metal oxide particles are believed to substantially surround the PTFE particles, but generally allow fibrils of PTFE to connect the compartmentalized PTFE major phase.

The invention is expected to be useful for a wide variety of applications whenever friction occurs and caustic chemicals are used, such as for fittings, bushings, and valves. The semiconductor industry has processes where PTFE is currently used at great expense for etching chemicals.

EXAMPLES

The present invention is further illustrated by the following specific Examples, which should not be construed as limiting the scope or content of the invention in any way.

Wear and friction tests were performed on PTFE nanocomposites according to the invention against counterfaces of varying surface finishes. Grade 304 stainless steel counterfaces, measuring 38 mm×25.4 mm×3.4 mm were used in these wear tests. This material had a measured Rockwell B hardness of 87 kg/mm$^2$. The surfaces were prepared using 4 different traditional finishing processes, including electro-polishing, lapping, wet-sanding, and dry-sanding. The electro-polished samples were prepared by wet-sanding with 600 grit silicon-carbide paper, followed by lapping, and finished by electro-polishing. Similarly, the lapped samples were initially wet sanded with the 600 grit silicon-carbide paper and then lapped. The wet-sanded samples were only exposed to the 600 grit silicon-carbide paper. The dry-sanded samples were initially wet sanded and then roughened with 80 grit "coarse" silicon-carbide paper. The samples were examined under a scanning white light interferometer with a 20× objective. Areas of 230 µm×300 µm were measured on 5 different samples from each batch. A gray-scale contour plot with accompanying line scans, amplitude parameters $R_a$ (average roughness) and $R_q$ (root mean squared roughness), and histograms of the surfaces are shown in FIG. 1. For these surfaces the average $R_q$ roughness and standard deviation between 5 samples (σ) was $R_q$=88 nm σ=16 nm, $R_q$=161 nm σ=35 nm, $R_q$=390 nm σ=27 nm, and $R_q$=578 nm σ=91 nm for the electro-polished, lapped, wet-sanded, and dry-sanded surfaces respectively. Four PTFE based nanocomposites, of composition 0, 1, 5 and 10 weight percent 44 nm $Al_2O_3$, were processed following the same approach as reported in [Sawyer, W. G., Freudenburg, K. D., Bhimaraj, P., and Schadler, L. S., (2003), "A Study on the Friction and Wear of Ptfe Filled with Alumina Nanoparticles," Wear, 254, pp. 573-580]. Briefly, the procedure involves blending the appropriate masses of constituent powders using a jet milling apparatus.

The mixtures were then compression molded, machined, measured and weighed; a density of the sample was calculated from these measurements. Results and organization of the experiments varying surface roughness and filler loading holding particle size constant are shown in Table 1 below. The experimental design consists of 4 counterface conditions and 4 particle loadings with repeat tests of unfilled PTFE and 5 wt. % alumina filled PTFE on the lapped counterface. This provides some indication of scatter in the data from processing variations.

TABLE 1

Tribological results of an experimental matrix that uses a new counterface and individually made composites samples with an alumina filler particle size of 44 nm. The $<>_n$ represents mean values over n experiments, otherwise only a single experiment was run. The units on wear rate K are $\times 10^{-6}$ mm$^3$/(Nm).

| counterface preparation | weight percent of 38 nm alumina filler | | | |
|---|---|---|---|---|
| | 0% | 1% | 5% | 10% |
| electro-polished | K = 695<br>µ = 0.165 | K = 174<br>µ = 0.175 | K = 52<br>µ = 0.191 | K = 75<br>µ = 0.178 |
| lapped | $<K>_6$ = 586<br>$<\mu>_6$ = 0.136 | K = 89<br>µ = 0.174 | $<K>_4$ = 66<br>$<\mu>_4$ = 0.173 | K = 38<br>µ = 0.184 |
| wet sanded | K = 770<br>µ = 0.135 | K = 85<br>µ = 0.172 | K = 99<br>µ = 0.162 | K = 50<br>µ = 0.163 |
| dry sanded | K = 634<br>µ = 0.142 | K = 293<br>µ = 0.159 | K = 294<br>µ = 0.145 | K = 97<br>µ = 0.183 |

It was hypothesized that increases in the non-dimensional roughness parameter $R_q/D_f$ (the ratio of the root-mean-squared roughness to the characteristic filler diameter) would increase the wear rate. While this parameter can be easily varied by changing only the surface roughness, another series of experiments described here varies the filler particle size as well. All of these composites were processed identically. The experimental design and results varying filler particle size and roughness holding filler loading constant are given in Table 2 below.

TABLE 2

Tribological results of an experimental matrix that uses a new counterface and individually made composites samples with an alumina filler particle noted. Each composite is 5 wt. % filler, balance PTFE. The $<>_n$ represents mean values over n experiments, otherwise only a single experiment was run. The units on wear rate K are $\times 10^{-6}$ mm$^3$/(Nm).

| counterface preparation | size of PTFE filler in 5 wt. % composites | | | |
|---|---|---|---|---|
| | unfilled | 44 nm | 80 nm | 500 nm |
| electro-polished | K = 695<br>µ = 0.165 | K = 52<br>µ = 0.191 | K = 0.80<br>µ = 0.191 | K = 70.3<br>µ = 0.152 |
| lapped | $<K>_6$ = 586<br>$<\mu>_6$ = 0.136 | $<K>_4$ = 66<br>$<\mu>_4$ = 0.173 | K = 0.84<br>µ = 0.158 | K = 47.4<br>µ = 0.174 |
| wet sanded | K = 770<br>µ = 0.135 | K = 99<br>µ = 0.162 | $<K>_2$ = 8.74<br>$<\mu>_2$ = 0.151 | K = 64.9<br>µ = 0.168 |
| dry sanded | K = 634<br>µ = 0.142 | K = 294<br>µ = 0.145 | K = 0.95<br>µ = 0.141 | $<K>_2$ = 664<br>$<\mu>_2$ = 0.145 |

Figure 2:
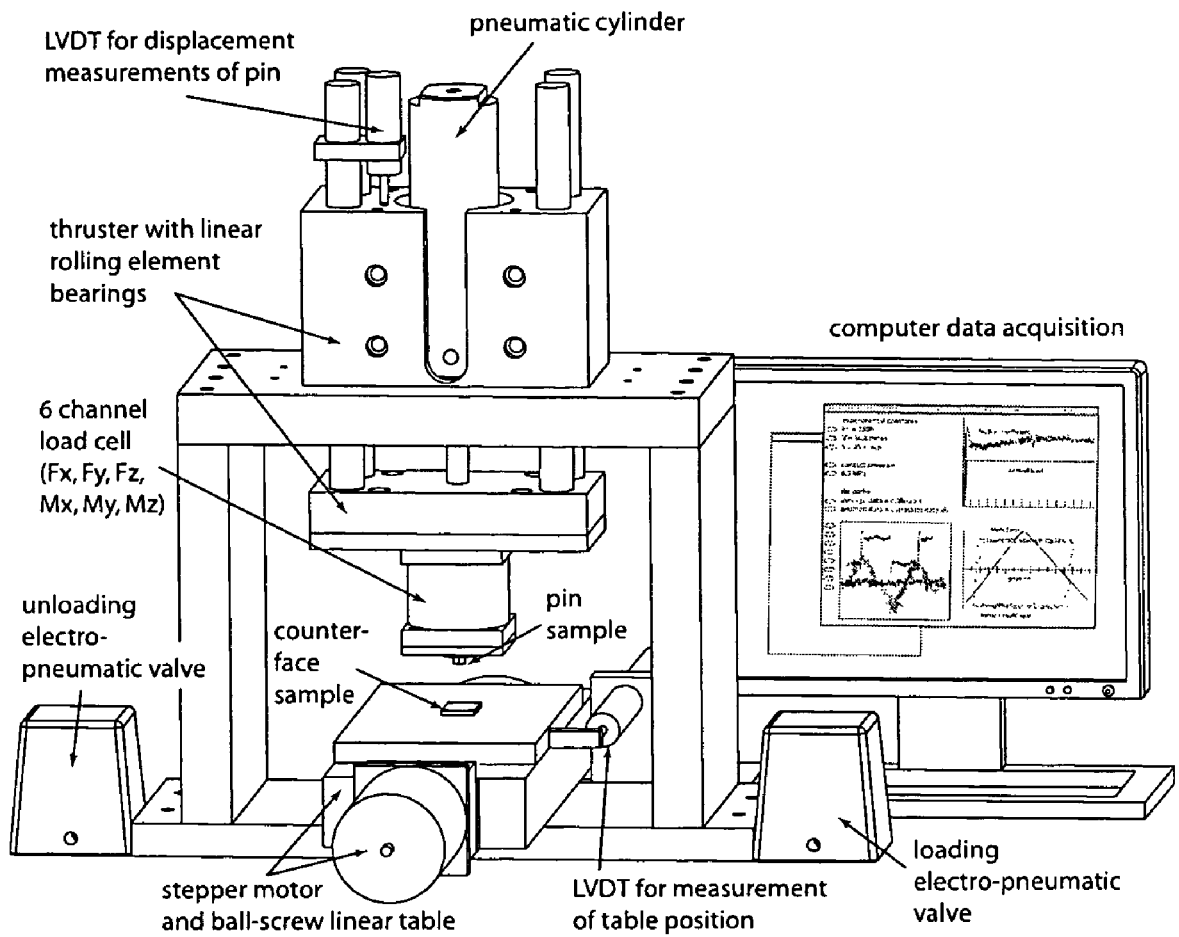
FIG. 2 shows a schematic of the tribometer used for friction and wear testing of PTFE nanocomposites according to the invention described in the Examples provided herein.

The linear reciprocating tribometer to obtain wear resistance data from PTFE nanocomposites according to the invention is shown schematically in FIG. 2. This tribometer is described in much more detail in [[Sawyer, W. G., Freudenburg, K. D., Bhimaraj, P., and Schadler, L. S., (2003), "A Study on the Friction and Wear of Ptfe Filled with Alumina Nanoparticles," *Wear*, 254, pp. 573-580]. Prior to testing, the counterfaces were washed in soap and water, cleaned with acetone, sonicated for ~15 minutes in methanol, and then dried. The nanocomposites were wiped down with methanol but were not washed or sonicated. A normal force of 250 N was continuously monitored and controlled. The normal load, friction force, stroke and pin displacement were continuously measured and recorded using a data acquisition system. The reciprocating length was 25.4 mm with an average sliding speed of 50.8 mm/s. The total distance of sliding depended on the wear resistance of the sample but, in general, was on the order of 500 m. The entire apparatus is located inside a soft-walled clean room with conditioned laboratory air of relative humidity between 25-50%.

Varying Filler Loading and Surface Finish at Constant Filler Diameter

Figure 3:
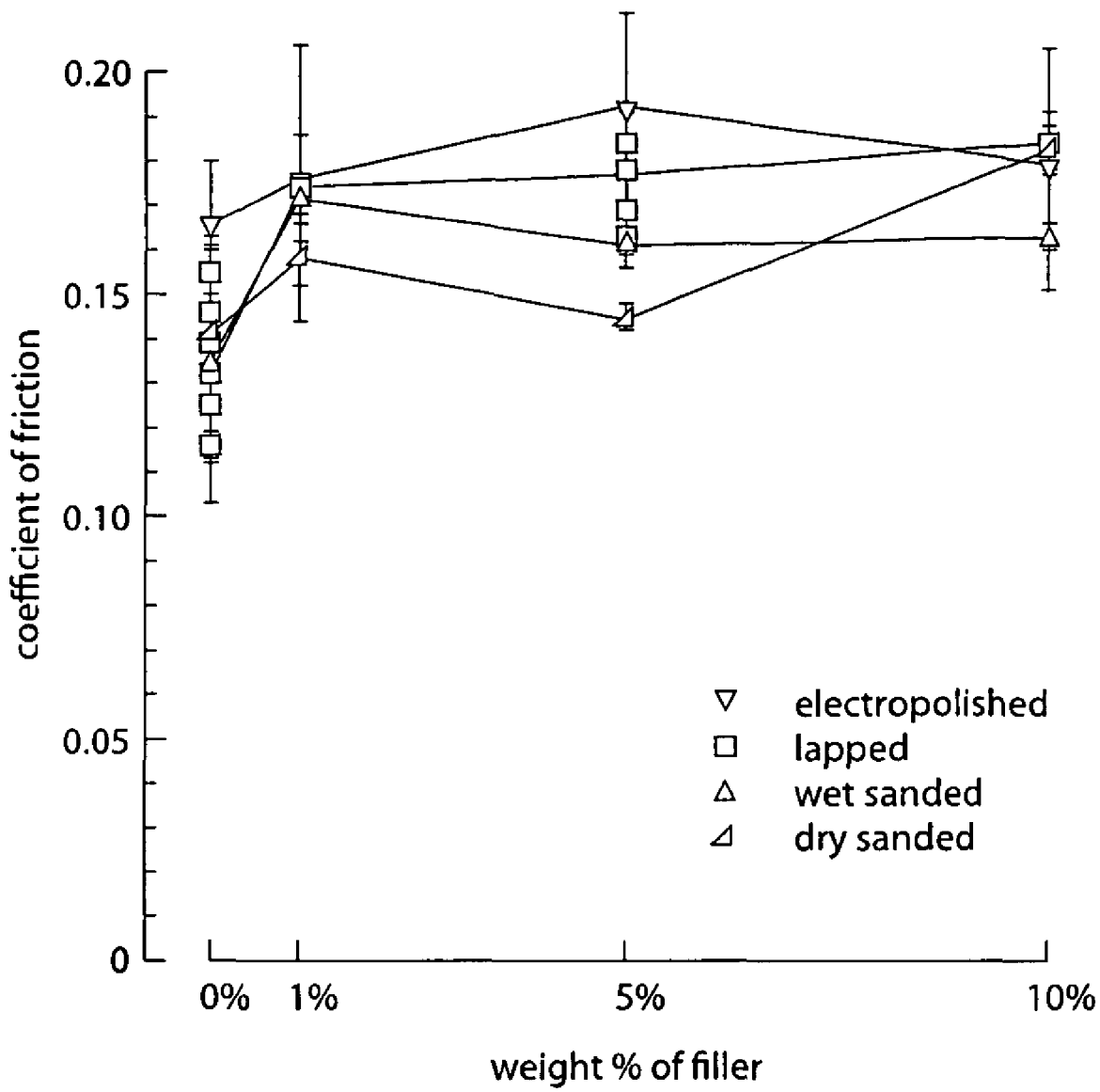
FIG. 3 provides average friction coefficient data for all 44 nm PTFE/alumina nanocomposites according to the invention plotted versus weight percent of alumina filler particles. The normal load was 250N and the sliding speed was 50 mm/s (the sliding distances varied). The error bars represent the standard deviation of the friction coefficient measured during each test.

The average friction coefficient data for these experiments are plotted in FIG. 3 versus filler weight percent. The error-bar on a coefficient of friction datum is the standard deviation of the friction coefficient data collected during the entire test. The friction coefficient was not significantly affected by changes in composition or surface roughness. It has the general trend of increasing slightly with increasing filler concentration and decreasing surface roughness. Friction is thought to increase with the addition of the ceramic particles because the filler and counterface is a higher friction pair than the PTFE and counterface.

Figure 4:
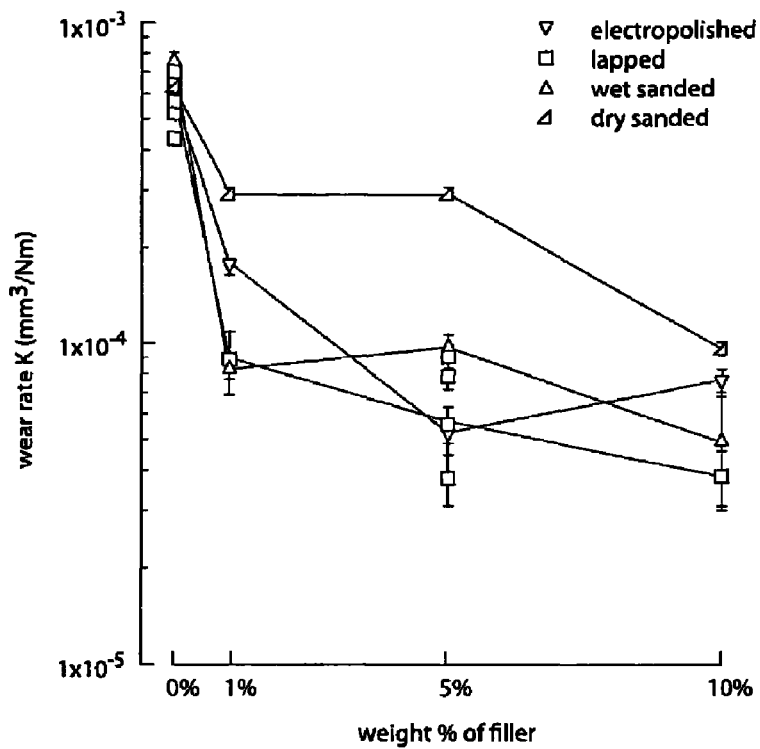
FIG. 4 provides average wear rate data for all 44 nm PTFE nanocomposites according to the invention plotted versus weight percent of alumina filler particles. The normal load was 250N and the sliding speed was 50 mm/s (the sliding distances varied). The error bars represent the standard uncertainty of the measurements.
Figure 5:
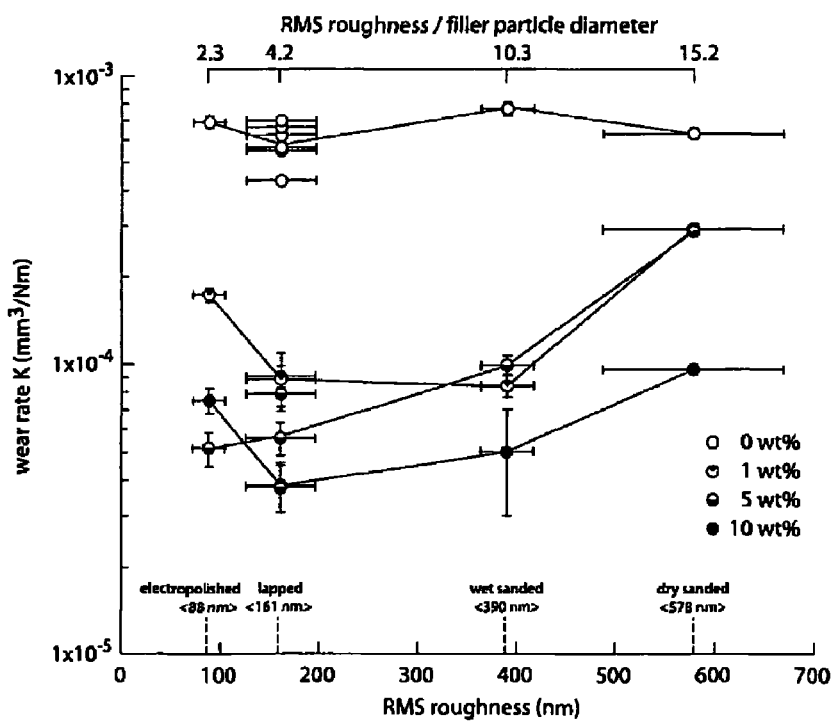
FIG. 5 provides average wear rate data for 44 nm PTFE nanocomposites according to the invention plotted versus the RMS roughness of the counterfaces and Rq/Df. The normal load was 250N and the sliding speed was 50 mm/s (the sliding distances varied). The vertical error bars represent the standard uncertainty of the measurement and the horizontal error bars represent the standard deviation of the RMS roughness over 5 samples.

The wear rates and uncertainties for these experiments were calculated using single point measurement of mass loss at the conclusion of the test. Numerous interrupted experiments were conducted to support the reasonableness of this method. The interrupted measurements showed a linear trend of volume lost with sliding distance. These data are plotted in FIG. 4 versus filler weight percent. The error-bar on a wear rate datum is the standard uncertainty of this measurement. The wear-rate was found to decrease monotonically with increasing filler content. FIG. 5 is a graph of the wear rate data plotted versus dimensionless roughness $R_q/D_f$. There is no relationship between wear-rate and normalized counterface roughness, but the wear-rate appears to be minimized on the lapped counterface ($R_q/D_f$~4). This apparent optimum may be due to filler particles mechanically engaging the valleys of the negatively skewed lapped counterface. Scanning white-light interferometric examination of the counterfaces revealed a trend of decreasing debris size, and thinner, more uniform transfer films with increasing filler loading and decreasing wear-rates.

Filler accumulation at the sliding interface should result in a wear-rate that decreases with increasing sliding distance. The wear volume of this particular nanocomposite is a linear function of the product of normal load and sliding distance, which suggests that filler accumulation at the interface is not the wear reduction mechanism. The linear trend of this material suggests that the surface composition is near steady-state at the onset of sliding.

Varying Filler Size and Surface Finish at Constant Filler Loading

Figure 6:
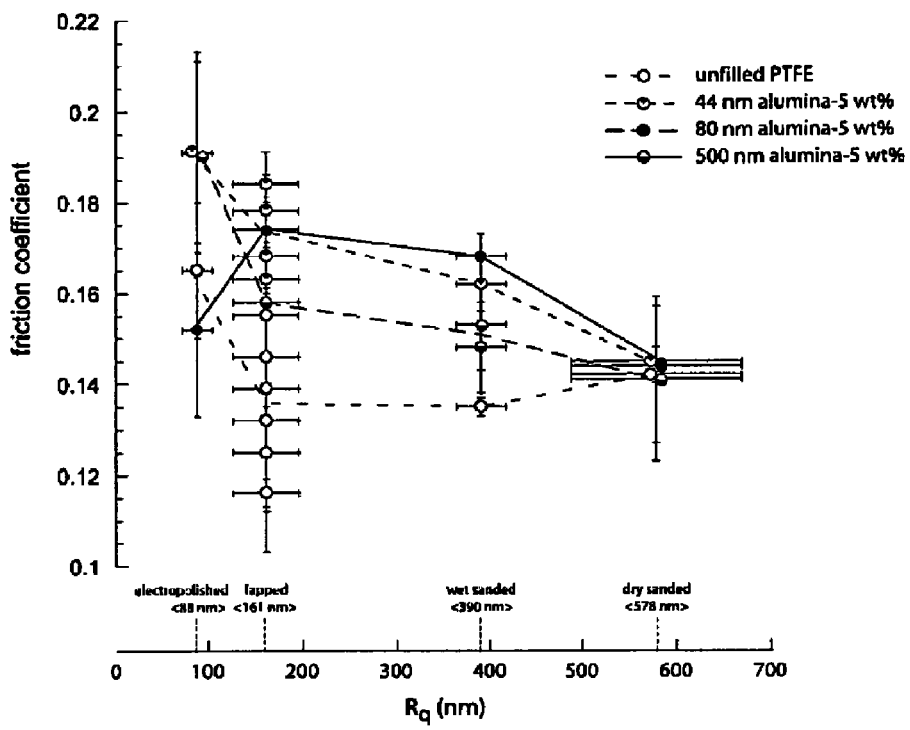
FIG. 6 provides average friction coefficient data for PTFE nanocomposites according to the invention plotted versus the RMS roughness of the counterfaces. The normal load was 250N and the sliding speed was 50 mm/s (the sliding distances varied). The vertical error bars represent the standard deviation of the measurements and the horizontal error bars represent the standard deviation of the RMS roughness over 5 samples.

The average friction coefficient data with error bars calculated as discussed previously are plotted versus counterface $R_q$ in FIG. 6, and given in Table 2 above. No conclusive trends in the friction coefficients of the 44 nm, 80 nm, and 500 nm composites were observed. Steady-state wear rates were calculated from interrupted mass measurements because the 80 nm composites exhibited a transient region of substantially higher wear-rate. This method of calculating wear-rate and uncertainty is described in detail by Schmitz et al [Schmitz, T. L., Action, J. E., Burris, D. L., Ziegert, J. C., and Sawyer, W. G., (2004), "Wear Rate Uncertainty Analysis," *accepted for publication ASME Journal of Tribology*.].

Figure 7:
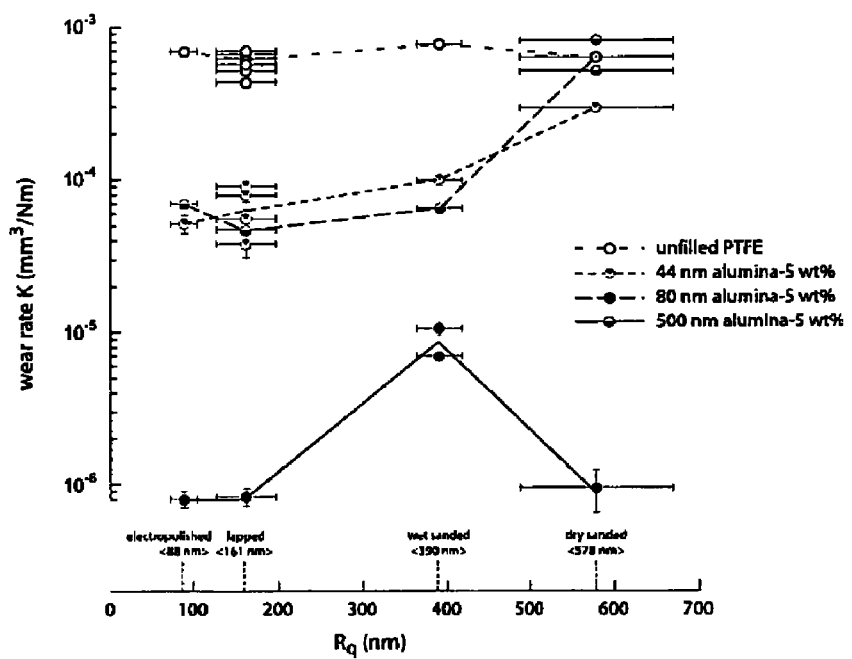
FIG. 7 provides average wear rate data for PTFE nanocomposites according to the invention plotted versus the RMS roughness of the counterfaces. The normal load was 250N and the sliding speed was 50 mm/s (the sliding distances varied). The vertical error bars represent the standard uncertainty of the measurement and the horizontal error bars represent the standard deviation of the RMS roughness over 5 samples.

The results of these wear tests are plotted in FIG. 7 versus the counterface $R_q$. In all cases the wear rate was the lowest on the lapped counterface, lapped counterfaces being a common and inexpensive finishing technique. The wear of unfilled PTFE is relatively insensitive to counterface roughness, varying by the scatter in the repeat experiments. The most prominent feature in this graph is the 100× reduction in wear rate for the 80 nm composite over the other composites. This may be the result of filler accumulation at the sliding interface by preferential removal of PTFE since this was also the only composite to have transient wear characteristics. However, wear rate for this composite increased by an order-of-magnitude on the wet-sanded counterface. The 44 nm and 500 nm composites had increased wear-rates on the dry-sanded counterface.

Transfer Film Examination

Various surface parameters are known significantly effect tribological interactions. In general, surfaces with negatively skewed histograms have good tribological properties. These surfaces are thought to perform well because the asperity peaks are broad and less abrasive while the valleys are deep and sharp providing sites for transfer film engagement. Perhaps the most important result is that the composites did not show as strong a sensitivity to the counterface roughness as was postulated. In fact, these nanocomposites can be used quite effectively on engineering surfaces and their ability to provide reduced wear rates is not limited to operation on the traditionally highly finished surfaces used in most laboratory testing.

Figure 8:
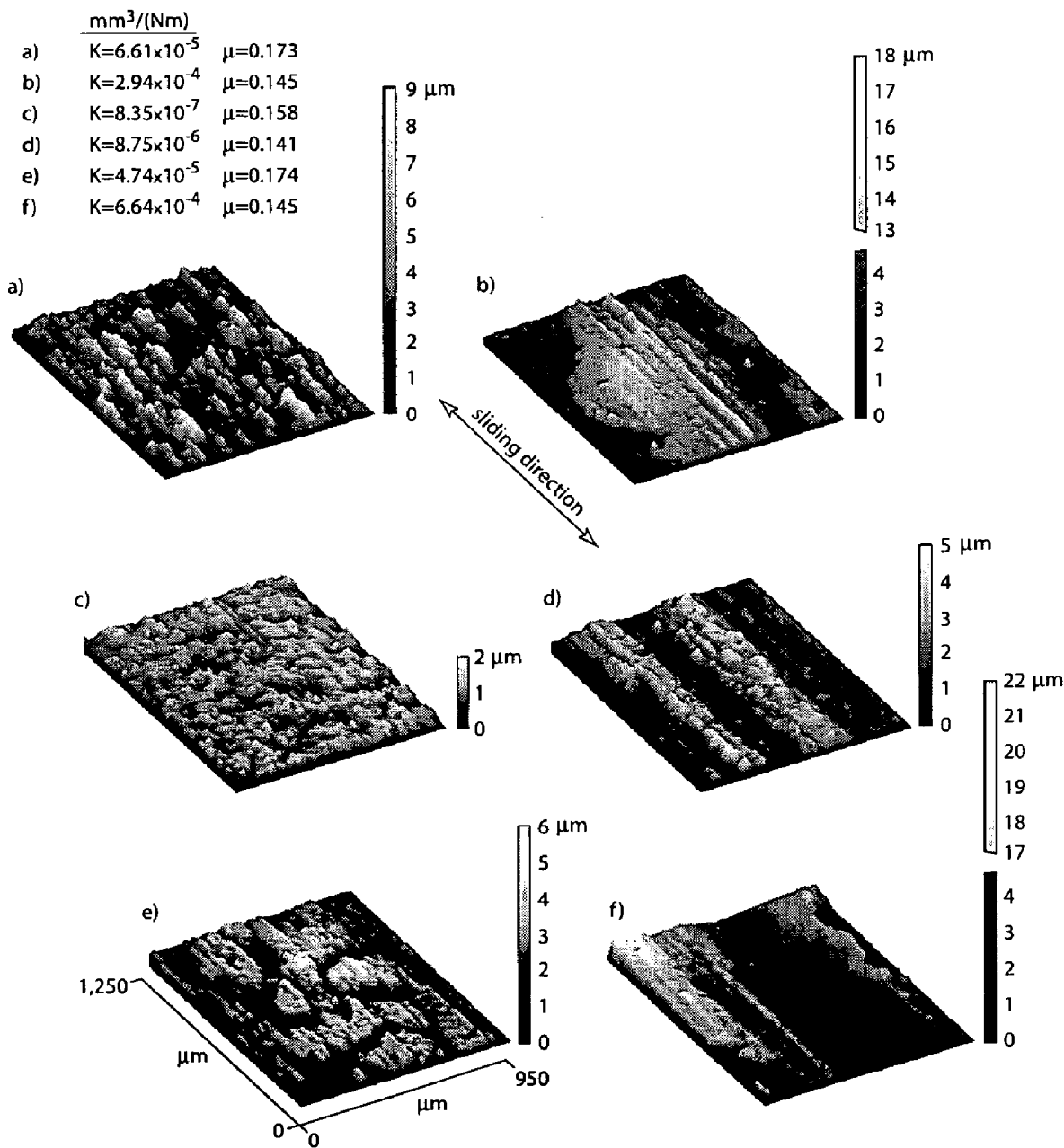
FIG. 8 provides scanning white-light interferometry images of representative transfer films according to the invention; a) 5 wt % 44 nm PTFE nanocomposites according to the invention on the lapped counterface, b) 5 wt. % 44 nm PTFE nanocomposites according to the invention on the dry-sanded counterface, c) 5 wt. % 80 nm PTFE nanocomposites according to the invention on the lapped counterface, d) 5 wt. % 80 nm PTFE nanocomposites according to the invention on the wet-sanded counterface, e) 5 wt % 500 nm PTFE nanocomposites according to the invention on the lapped counterface, f) 5 wt. % 500 nm PTFE nanocomposites according to the invention on the dry-sanded counterface FIG. 9 provides wear-rate and coefficient of friction data for PTFE nanocomposites according to the invention plotted versus transfer film thickness. There is a correlation seen between wear and transfer film thickness.
Figure 9:
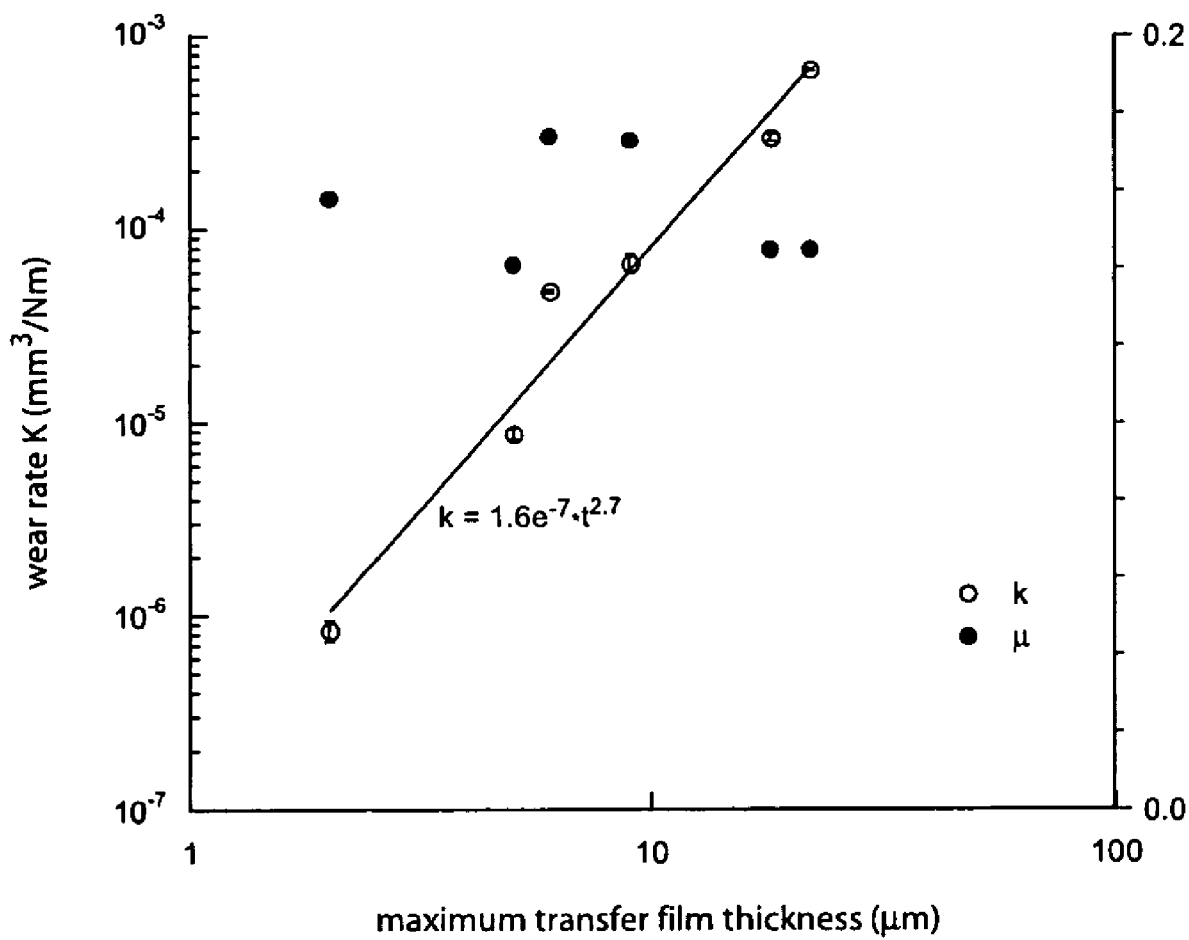

One constant in filled PTFE composites research is that low wear-rates are accompanied by small wear debris. The nature of the transfer films, and specifically the thickness and coverage was quantitatively analyzed using a scanning white-light interferometer. The worst performing and best performing transfer films for each composite are shown in FIG. 8. It is evident from these scans that there is a direct relationship between the thickness of the transfer film and the wear-rate. Additionally, the thin transfer films appear more uniformly distributed across the counterface, while the thicker films are more banded in the direction of sliding for a given composite. FIG. 9 shows wear-rate and friction coefficient plotted versus maximum transfer film thickness. The wear-rate data follow a power law curve fit. The friction coefficient appears to be independent of transfer film thickness and morphology.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method of forming wear resistant composite materials, comprising the steps of:
    blending nanoscale metal oxide particles and PTFE particles, wherein said metal oxide particles are irregular shaped alumina nanoparticles, wherein a jet milling apparatus is used for said blending step, and
    heating said nanoscale metal oxide particles and PTFE particles to form a nanocomposite, said irregularly shaped metal oxide alumina nanoparticles having a shape characteristic of crushed or milled particles and comprise 3 to 7 wt % of said nanocomposite, wherein the alumina nanoparticles have a size of 44 to 500 nm, wherein the composite has a steady state wear rate of $K<9.9\times10^{-5}$ mm$^3$/(Nm), wherein said heating step comprises compression molding.

2. The method of claim 1, wherein said PTFE comprises a major phase of said PTFE-based composite material.

3. A PTFE-based composite material, comprising: a PTFE comprising major phase filled with a metal oxide minor phase, wherein said major phase is intermixed with said metal oxide minor phase, said minor phase comprising a plurality of irregularly shaped alumina nanoparticles, said minor phase comprising 3 to 7 wt. % of said composite, wherein said irregularly shaped alumina nanoparticles have shapes characteristic of crushed or milled particles, wherein the alumina nanoparticles have a size of 44 to 500 nm, wherein the composite material has a steady state wear rate of $K<9.9\times10^{-5}$ mm$^3$/(Nm).

4. The composite of claim 3, wherein said shapes characteristic of milled particles are selected from the group consisting of asperities, points, edges, flat areas, and combinations thereof.

5. The composite of claim 3, wherein said composite provides a steady state wear rate of $K<2\times10^{-5}$ mm$^3$/(Nm) for a 5% wt. % minor phase composite.

* * * * *